US008887101B2

(12) United States Patent　　(10) Patent No.: US 8,887,101 B2
Huang　　(45) Date of Patent: Nov. 11, 2014

(54) METHOD FOR MOVING A CURSOR AND DISPLAY APPARATUS USING THE SAME

(75) Inventor: Hung Chi Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 387 days.

(21) Appl. No.: 12/605,424

(22) Filed: Oct. 26, 2009

(65) Prior Publication Data

US 2010/0257488 A1　Oct. 7, 2010

(30) Foreign Application Priority Data

Apr. 1, 2009 (TW) ................................ 98110917 A

(51) Int. Cl.
*G06F 3/048* (2013.01)
*G06F 3/0481* (2013.01)
*H04N 5/44* (2011.01)

(52) U.S. Cl.
CPC ...... *G06F 3/0481* (2013.01); *H04N 2005/4419* (2013.01)
USPC ............................ 715/856; 715/803; 715/838

(58) Field of Classification Search
CPC G06F 3/04892; G06F 3/04886; G06F 3/0481
USPC ........................................... 715/856, 803, 838
See application file for complete search history.

(56) References Cited

U.S. PATENT DOCUMENTS

| 7,526,316 | B2 * | 4/2009 | Shimizu ......................... 455/557 |
| 7,607,109 | B2 * | 10/2009 | Ohno et al. .................... 715/838 |
| 7,620,910 | B2 * | 11/2009 | Ohno et al. .................... 715/790 |
| 7,644,426 | B2 * | 1/2010 | Suh .................................. 725/43 |
| 2002/0184623 | A1 * | 12/2002 | Hodge et al. ..................... 725/37 |
| 2004/0224774 | A1 * | 11/2004 | Nakai ............................... 463/42 |
| 2004/0261103 | A1 * | 12/2004 | Ohno et al. ....................... 725/38 |
| 2007/0015534 | A1 * | 1/2007 | Shimizu .................... 455/550.1 |
| 2008/0178217 | A1 * | 7/2008 | Ohno et al. ....................... 725/39 |
| 2010/0235781 | A1 * | 9/2010 | Friedlander et al. .......... 715/803 |

FOREIGN PATENT DOCUMENTS

| CN | 1573673 | * | 2/2004 | ............. G06F 3/033 |
| CN | 1573673 |  | 2/2005 | |
| CN | 1897597 A |  | 1/2007 | |
| EP | 1744240 A1 |  | 1/2007 | |
| JP | S63311519 |  | 12/1988 | |
| JP | H06259219 |  | 9/1994 | |

(Continued)

OTHER PUBLICATIONS

Debarba et al., LOP-cursor: Fast and Precise Interaction with Tiled Displays Using One Hand and Levels of Precision; IEEE; © 2012; 8 pages.*

(Continued)

*Primary Examiner* — Linh K Pham
(74) *Attorney, Agent, or Firm* — WPAT, PC; Justin King

(57) ABSTRACT

The invention provides a method for moving a cursor applied in a display apparatus, wherein the movement of the cursor and the selection of the target are achieved by pressing the Arabic numeral buttons on a remote controller by the user, so that a simple and direct operation is provided. The method according to the invention includes: in response to the first control command, displaying a plurality of first sub-regions on the display apparatus; in response to a second control command, selecting one of the first sub-regions; and moving the cursor to the selected first sub-region.

10 Claims, 7 Drawing Sheets

(56) References Cited

FOREIGN PATENT DOCUMENTS

| | | |
|---|---|---|
| JP | 2002014773 | 1/2002 |
| JP | 2005173087 | 6/2005 |
| JP | 2007027851 | 2/2007 |
| JP | 2009237865 | 10/2009 |
| WO | 2009146731 | 12/2009 |

OTHER PUBLICATIONS

Jedrysil et al; Interactive Displays for Command and Control; IEEE; 2000; pp. 341-351.*
"European search report", European Patent Office, Oct. 26, 2010.
Japanese Patent Office, "Office Action", issued Jul. 2, 2013.
Taiwan Intellectual Property Office, "Office Action", Mar. 22, 2013, Taiwan.

* cited by examiner

METHOD FOR MOVING A CURSOR AND DISPLAY APPARATUS USING THE SAME

CROSS REFERENCE TO RELATED PATENT APPLICATION

This patent application is based on Taiwan, R.O.C. patent application No. 98110917 filed on Apr. 1, 2009.

FIELD OF THE INVENTION

The present invention relates to a method for moving a cursor and a display apparatus using the same, and more particularly to a method for moving and hitting the cursor by a remote controller and a display apparatus using the same.

BACKGROUND OF THE INVENTION

In modern life, the Internet connects people all over the world. More and more electronic apparatus equipped with a screen, such as personal computers, mobile phones and so on, mostly have the ability to connect to the Internet in order to allow users to browse web pages. Further, connecting to the Internet through a television also seems to be a trend.

When connecting to the Internet using a personal computer, one can conveniently control a cursor by using a mouse. However, conventionally, one suffers a problem of how to control the cursor when connecting to the Internet through a television. The screen of the television is rather larger and user is confined with the length of a mouse cable when using the mouse to control the cursor, such that user may have to sit very closely to the television, which makes user's eyes tired. One may certainly solve this problem by a wireless mouse but then the wireless mouse needs to be additionally purchased. Furthermore, according to long-standing habits, user is still accustomed to use a remote controller to control the television.

Therefore, it is an important issue for how to control a cursor movement and an object selection by the remote controller when connecting to the Internet through a television.

SUMMARY OF THE INVENTION

The present invention relates to a method for moving a cursor and a display apparatus using the same, which allows users to move the cursor and select an object by pressing a corresponding Arabic numeral button, and further provides users with a convenient and intuitional operation method.

According to one embodiment of the present invention, a method for moving a cursor, applied in a display apparatus, is provided. The method comprises: displaying a plurality of first-tier sub-regions on a screen of the display apparatus in response to a first control command; selecting one of the first-tier sub-regions in response to a second control command; and moving the cursor to the selected first-tier sub-region.

According to another embodiment of the present invention, a display apparatus is disclosed. The display apparatus comprises: a command receiving module, for receiving a first control command and a second control command from a remote controller; an on-screen display (OSD) module; and a processing module for controlling the OSD module according to the control commands received by the command receiving module; wherein, the processing module controls the OSD module to display a plurality of first-tier sub-regions on a screen of the display apparatus in response to the first control command; and the processing module selects one of the first-tier sub-regions and moves a cursor to the selected first-tier sub-region in response to the second control command.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

According to embodiments of the present invention, a user can use a remote controller to control a movement of a cursor and select an object. Moreover, an image on a screen can further be divided into a plurality of sub-regions corresponding to the user's control command. So, the user can use the remote controller to select one sub-region in order to move the cursor to the sub-region. In one embodiment of the present invention, a display apparatus is capable of connecting to the Internet, which means that the display apparatus does not need to connect to an external host and still can connect to the Internet. In another embodiment of the present invention, the display apparatus needs to connect to the external host to connect to the Internet. The embodiments shall be described below.

Figure 1:
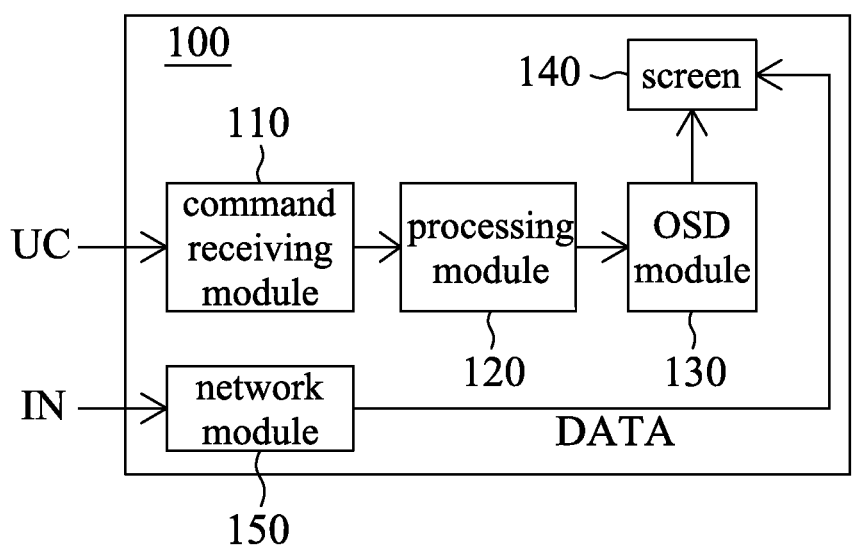
FIG. 1 is a function block diagram of a display apparatus according to a first embodiment of the present invention.

A first embodiment according to the invention in which a display apparatus has an ability to connect to the Internet is discussed below. FIG. 1 illustrates a function block diagram of the first embodiment of the present invention. In the first embodiment of the present invention, a display apparatus 100, such as a television, is capable of connecting to the Internet.

As shown in FIG. 1, the display apparatus 100 comprises a command receiving module 110, a processing module 120, an on-screen display (OSD) module 130, a screen 140, and a network module 150.

The command receiving module 110 receives a control command UC from a remote controller (not shown) of the display apparatus 100, and the control command UC is generated by pressing a button on the remote controller.

The OSD module 130 generates an image on the screen 140, such as to generate a control menu image. The control menu image can be added to an image signal received by the display apparatus 100 in order to display both the control menu image and the received image signal on the screen 140.

The processing module 120, coupled to the command receiving module 110 and the OSD module 130, controls the OSD module 130 according to the control command UC received by the command receiving module 110.

The screen 140 displays an image signal DATA (such as a website content) and an image generated by the OSD module 130.

The network module 150 performs network transmission/reception. In this embodiment, the network module 150 outputs the image signal DATA to the screen 140 by processing an input data IN, e.g., the website content.

Figure 2:
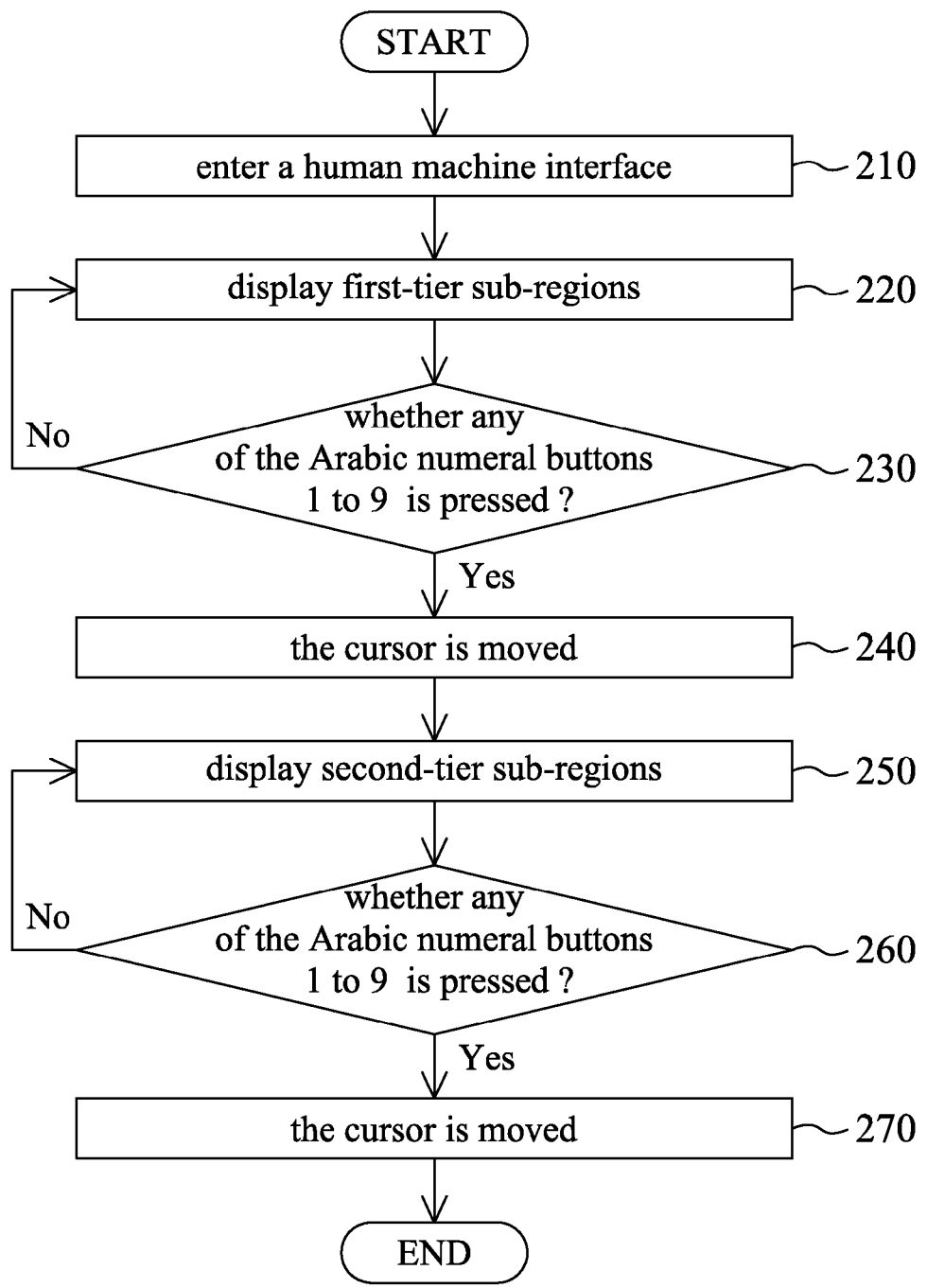
FIG. 2 is a flowchart illustrating a method for controlling a cursor according to the first embodiment of the present invention.

FIG. 2 illustrates a flowchart of controlling a cursor according to the first embodiment of the present invention, and FIGS. 3 to 6 illustrate operation diagrams of an image displayed on the screen 140 according to the first embodiment of the present invention. The following description is given with reference to FIGS. 1 to 6.

First, a user presses one certain predetermined button or a combination of buttons on the remote controller to send a first control command to make the display apparatus 100 enter a human machine interface, as Step 210. For example, the user can use the remote controller to input "000" by pressing a "0" button consecutively three times to make the display apparatus 100 enter the human machine interface. In this embodiment, entering the human machine interface means entering a cursor control mode.

Then, in response to the first control command sent by the remote controller, the processing module 120 controls the OSD module 130 to display a plurality of first-tier sub-regions on the screen 140, as Step 220.

Figure 3:
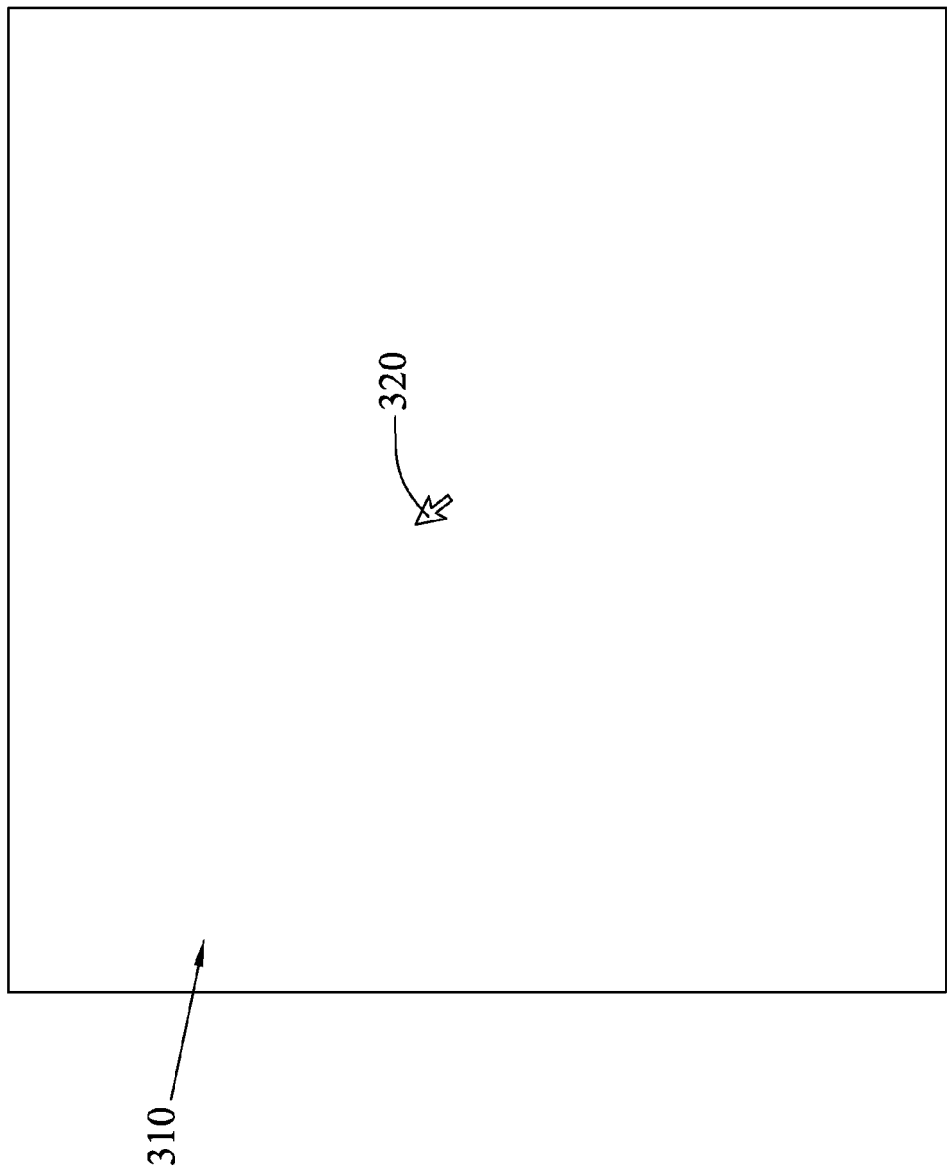
FIGS. 3 to 6 are a series of operation schematic diagrams according to the first embodiment of the present invention.
Figure 4:
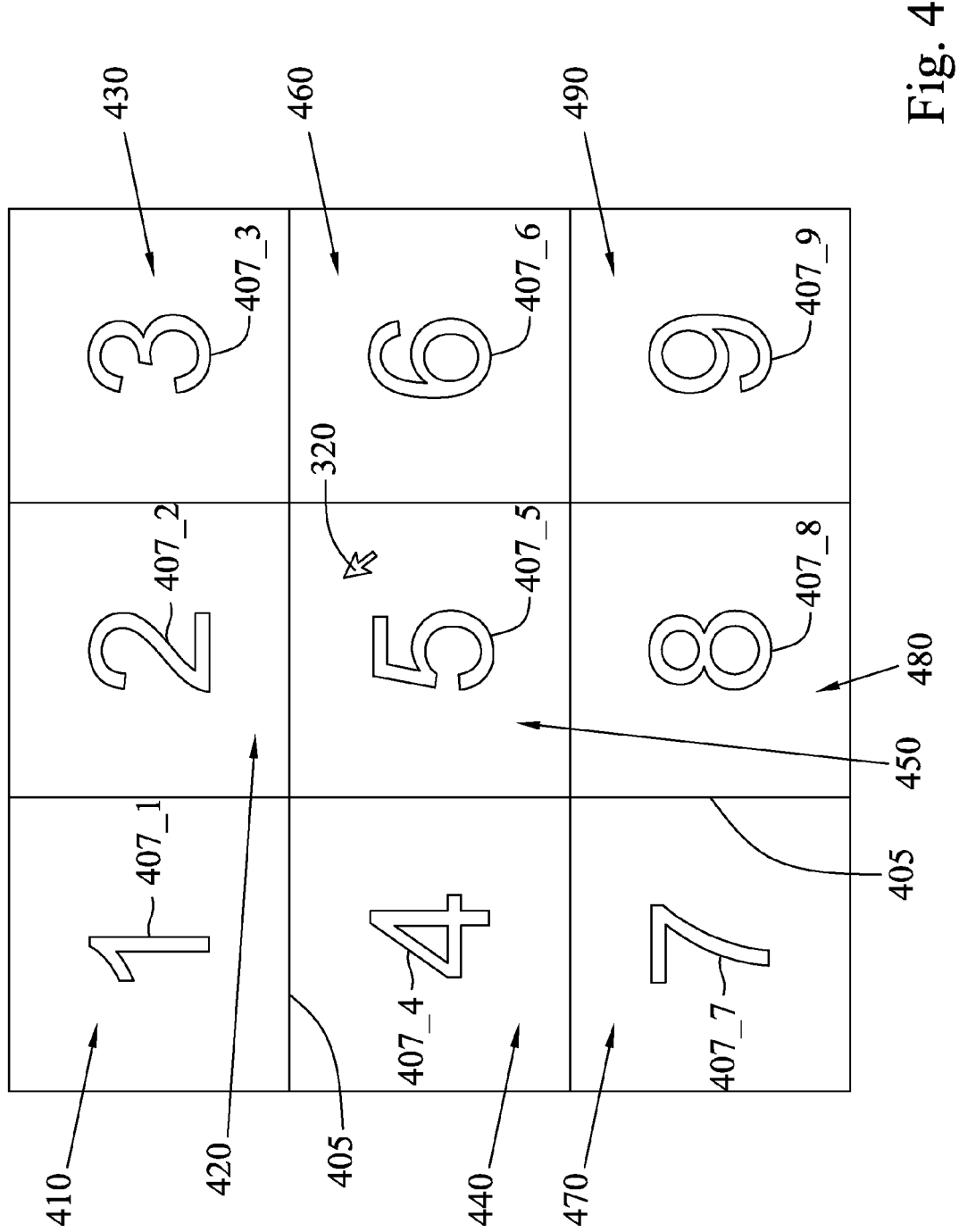

FIG. 3 illustrates a schematic diagram of the display apparatus 100 not entered the human machine interface yet. Meanwhile, the screen 140 of the display apparatus 100 displays an original image 310, i.e., the image signal DATA, and a cursor 320. FIG. 4 illustrates a schematic diagram of the original image 310, the cursor 320 and nine first-tier sub-regions 410 to 490.

To be more exact, the processing module 120 receives and analyzes the control command. When receiving the first control command as a control command that indicates the display apparatus to enter the human machine interface, the processing module 120 controls the OSD module 130 to display four grid lines 405 (two of which are horizontal and the remaining two are vertical) on the screen 140 to define nine first-tier sub-regions 410 to 490. The OSD module 130 further displays nine reference symbols 407_1 to 407_9 respectively within the first-tier sub-regions 410 to 490. In this embodiment, the reference symbols 407_1 to 407_9 can be Arabic numbers 1 to 9 respectively, which correspond to Arabic numeral buttons 1 to 9 on the remote controller to represent the first-tier sub-regions 410 to 490. For example, the reference symbol 407_2 of the first-tier sub-region 420 is an Arabic number 2, which means that the first-tier sub-region 420 is selected when the user presses the Arabic numeral button 2 on the remote controller. In a default condition, the cursor 320 is displayed within the first-tier sub-region 450.

Moreover, to provide convenient identification purposes, a display color of the grid lines 405 can differ from that of the reference symbols 407_1 to 407_9. For example, the display color of the grid lines 405 can be red, and the display color of the reference symbols 407_1 to 407_9 can be yellow. It is to be noted that the display color, the number of the first-tier sub-regions, and the number of the reference symbols in the description are used as illustration examples, and are not meant to be limitations of the invention.

Then, as Step 230, it is determined whether any of the Arabic numeral buttons 1 to 9 is pressed. That is, it is determined whether a next control command (i.e., a second control command) is received. If a result from Step 230 is negative, the method shall go back to Step 220 to wait for the next control command. If the next control command is received, Step 240 is performed.

In Step 240, the cursor is moved to a destination in response to the Arabic numeral button pressed by the user. In detail, the processing module 120 analyzes which one of the Arabic numeral buttons is pressed to distinguish which one of the first-tier sub-regions 410 to 490 is a desired region. Then, the cursor is moved inside the selected first-tier sub-region among the first-tier sub-regions 410 to 490.

Then, the OSD module 130 displays a plurality of second-tier sub-regions within one of the first-tier sub-regions 410 to 490 under the control of the processing module 120, as Step 250. In detail, the processing module 120 controls the OSD module 130 to display nine second-tier sub-regions within the corresponding first-tier sub-region according to the pressed Arabic numeral button.

Figure 5:
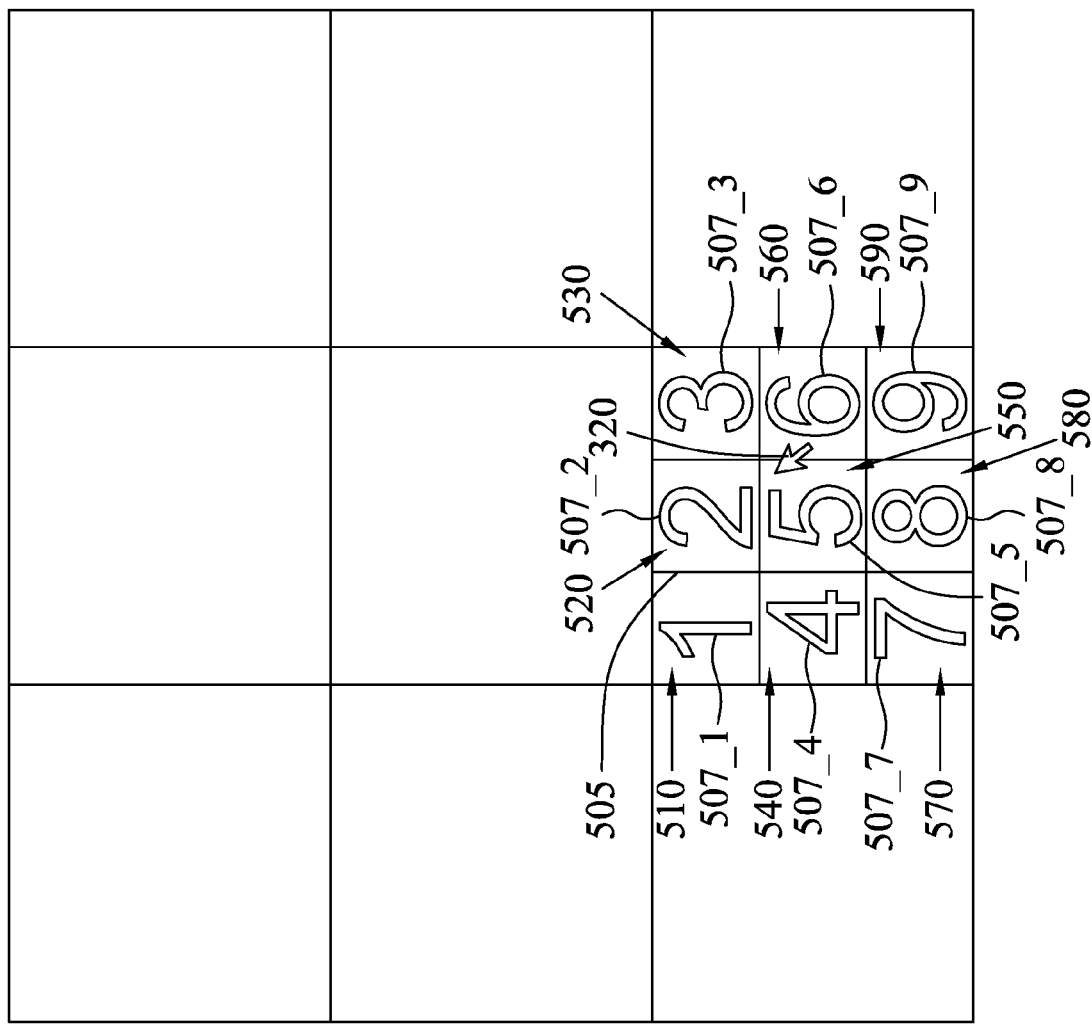

The description of Step 240 and Step 250 is given with reference to FIG. 5. FIG. 5 illustrates a schematic diagram of displaying nine second-tier sub-regions on the screen 140. Take pressing the Arabic numeral button "8" for example. When the Arabic numeral button "8" is pressed, the cursor 320 is moved to the desired first-tier sub-region 480, and the interior of the first-tier sub-region 480 is displayed with second-tier sub-regions 510 to 590. Moreover, to provide convenience and identification purposes, the OSD module 130 further displays grid lines 505 (in horizontal and vertical) and reference symbols 507_1 to 507_9 within the first-tier sub-region 480, and the cursor 320 is set to locate within the second-tier sub-region 550 as a default setting. That is to say, the user only needs to press the Arabic numeral button "8", and the cursor 320 is moved to the corresponding position (the first-tier sub-region 480). Further, the OSD module 130 divides the selected sub-region to get ready for the user's next instruction.

Figure 6:
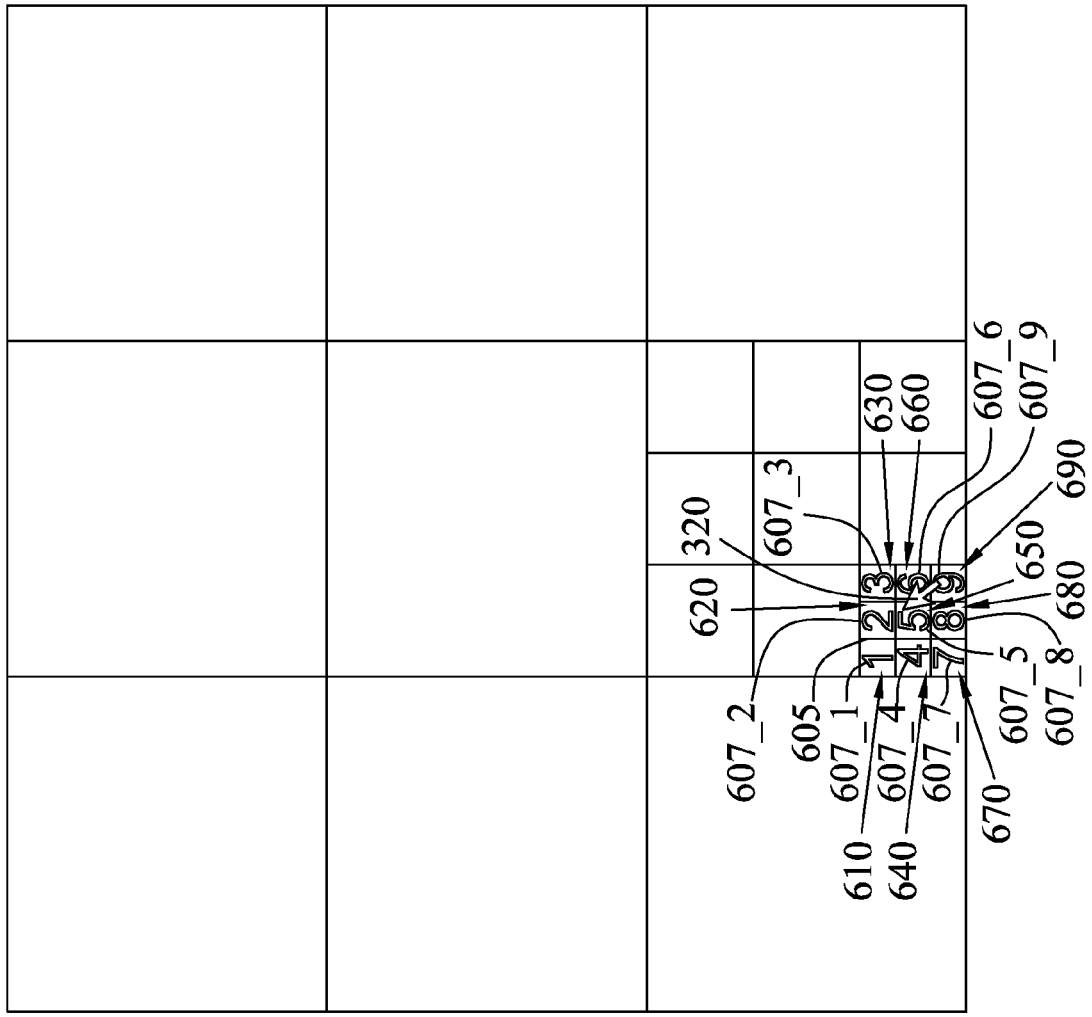

In this embodiment, one of the second-tier sub-regions 510 to 590 can be chosen to be divided in order to define a more accurate position. For example, while the screen 140 displays the second-tier sub-regions 510 to 590, the cursor 320 is moved to the second-tier sub-region 570 when the Arabic numeral button "7" is pressed, such that third-tier sub-regions 610 to 690, grid lines 605 (horizontal and vertical) and reference symbols 607_1 to 607_9 are displayed within the second-tier sub-region 570, as shown in FIG. 6.

Furthermore, when the cursor moves to a desired destination, the user can press another button (such as the Arabic numeral button "0") on the remote controller to generate a cursor hitting event to select an object where the cursor is located. That is, at this point, pressing the Arabic numeral button "0" on the remote controller is equivalent to clicking a left button on a mouse.

It is to be noted that the first embodiment of the present invention needs not to be limited to only displaying the sub-regions of three tiers. With repeating the above steps, the first embodiment of the invention can display sub-regions of more than three tiers on the screen in order to display more sub-regions with even smaller regions, so as to allow one to more convenient to move the cursor to the desired position (the sub-region) with better operation accuracy.

Figure 7:
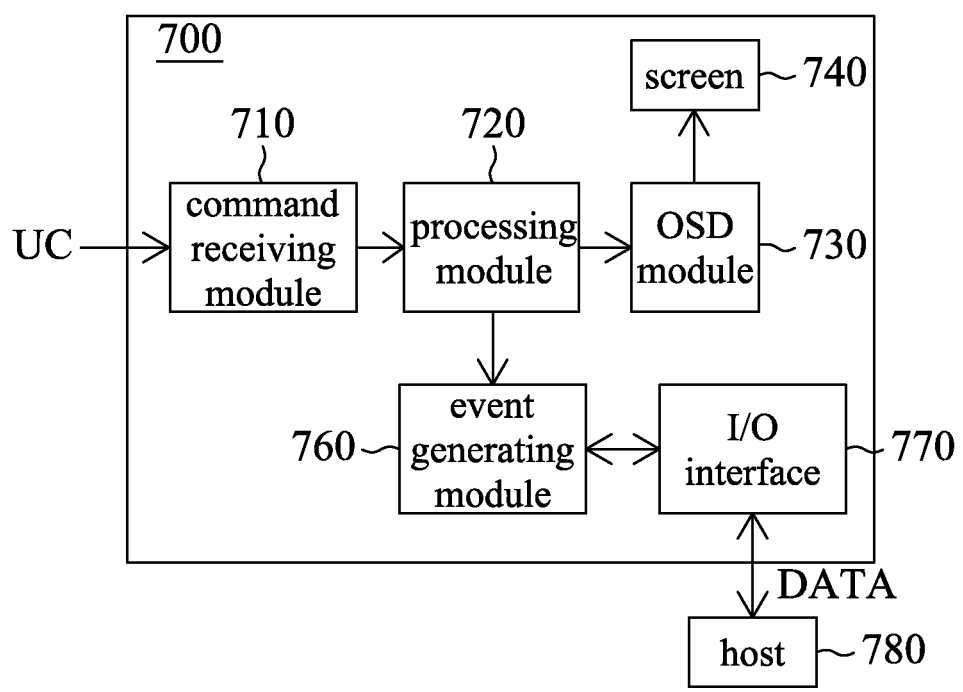
FIG. 7 is a function block diagram of a display apparatus according to a second embodiment of the present invention.

A second embodiment of the invention in which a display apparatus is connected to an external host is described below. FIG. 7 discloses a function block diagram of the display apparatus according to the second embodiment of the invention. In the second embodiment of the invention, a display apparatus 700, such as a television, is not capable of connecting to the Internet and needs to receive an image signal DATA, e.g., a website content, sent by an external host 780, such as a personal computer.

As shown in FIG. 7, the display apparatus 700 according to the second embodiment of the invention comprises a command receiving module 710, a processing module 720, an OSD module 730, a screen 740, an event generating module 760 and an input/output (I/O) interface 770. The command receiving module 710, the processing module 720, the OSD module 730, and the screen 740 can be the same as or similar to the command receiving module 110, the processing module 120, the OSD module 130, and the screen 140 in the first embodiment, and hence the detailed description therefor is omitted here.

The event generating module 760 generates a cursor movement event and a cursor hitting event according to the control commands triggered by the user, and then informs the external host 780 via the I/O interface 770. In detail, after the processing module 720 analyzes a control command UC received from the command receiving module 710, provided that the control command UC represents a cursor movement or a cursor hit, the processing module 720 informs the event generating module 760 to generate the cursor movement event or the cursor hitting event via a movement control signal and a hitting control signal respectively; then the cursor movement event and the cursor hitting event are sent to the external host 780 via the I/O interface 770.

When the user wants to move the cursor, that is, when any one of the Arabic numeral buttons "1" to "9" is pressed, the event generating module 760 needs to generate the cursor movement event in response and inform the external host 780.

However, a resolution of the image signal DATA output from the external host 780 to the display apparatus 700 may be different from that of the screen 740. Here, assume the resolution of the screen 740 is 1920*1080, and the resolution of the image signal DATA is 800*600. Under such conditions, the event generating module 760 needs to perform a coordinate transformation from a first coordinate (x1, y1) of the selected sub-region to generate a second coordinate (x2, y2) corresponding to the image signal according to the resolution of the screen 740 of the display apparatus 700 and the resolution of the image signal DATA.

According to the above description of the embodiment, a selected sub-region can be any sub-region from the first-tier sub-regions to the second-tier sub-regions. More specifically, taking FIG. 5 for example, the cursor is shown on a central position of the second-tier sub-region 550 since the Arabic numeral button "8" is pressed, and the first coordinate (x1, y1) is the central position of the selected sub-region, e.g., the second-tier sub-region 550. Further, the second coordinate (x2, y2) is obtained from the event generating module 760, such as via a lookup table or an internal calculation.

A relation between the first coordinate (x1, y1) and the second coordinate (x2, y2) is as follows:

x2/x1=800/1920
y2/y1=600/1080

Therefore, when the display apparatus 700 enters the human machine interface, the external host 780 informs the event generating module 760 about the resolution of the image signal DATA. On the other hand, the display apparatus 700 can directly analyze the image signal DATA to obtain the resolution of the image signal DATA. The event generating module 760 makes the second coordinate be included in the notice information of the cursor movement event to notify the external host 780.

When the user's control command is a cursor hit, the event generating module 760 needs to generate the cursor hitting event in response and inform the external host 780. For example, as the above embodiment, when the Arabic numeral button "0" is pressed, which is regarded as the cursor hitting event, the event generating module 760 needs to generate the cursor hitting event accordingly and inform the external host 780 of this cursor hitting event.

The I/O interface 770 further receives the image signal DATA sent by the external host 780, and such image signal DATA is displayed on the screen 740. Furthermore, the I/O interface 770 sends the cursor movement event and the cursor hitting event generated by the event generating module 760 to the external host 780 in order to proceed with a corresponding operation.

As to in the second embodiment, the operations of cursor movement/hit are the same as or similar to that in the first embodiment, so the detailed description is not repeated here.

According to the cursor movement method and the display apparatus using the same disclosed by the above embodiments of the invention, when the user uses the display apparatus, such as the television, to connect to the Internet, moving/hitting the cursor can be easily achieved by pressing the corresponding Arabic numeral button on the remote controller and the operation is quite simple and intuitional. So such operation matches the long-stand habits that people having in using the remote controller to control the television. Besides, the cursor movement method of the invention is applicable to the remote controller of the common television, and hence an additional wireless mouse needs not to be purchased such that one is not burdened with extra costs.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for moving a cursor in a display apparatus, comprising:
    displaying a plurality of first-tier sub-regions on a screen of the display apparatus in response to a first control command, wherein the screen has a screen resolution;
    displaying a plurality of first Arabic numeral reference symbols respectively within the plurality of first-tier sub-regions, such that each one of the plurality of first-tier sub regions corresponds to a particular one of the first Arabic numeral reference symbols;
    selecting one of the first-tier sub-regions in response to a second control command;
    moving the cursor to the selected first-tier sub-region with a first coordinate based on the screen resolution;
    receiving an image signal with an image resolution from an external host and displaying the image signal on the screen with the screen resolution;
    generating a second coordinate in the image resolution by transforming the first coordinate in the screen resolution;
    sending the second coordinate to the external host;
    moving the cursor according to the second coordinate; and
    dividing the selected first-tier sub-region into a plurality of second-tier sub-regions; wherein actuation of a predetermined button on a remote controller of the display apparatus three consecutive times causes the display apparatus to enter a cursor control mode.

2. The method according to claim 1, wherein the first-tier sub-regions and the second-tier sub-regions are generated by an on-screen display (OSD) module of the display apparatus.

3. The method according to claim 1, wherein the first control command and the second control command are received from the remote controller of the display apparatus.

4. The method according to claim 3, wherein the first reference symbols correspond to a plurality of buttons on the remote controller, respectively.

5. The method according to claim 1, further comprising: displaying a plurality of second reference symbols respectively within the second-tier sub-regions.

6. The method according to claim 1, wherein the step of displaying the first-tier sub-regions on the screen of the display apparatus in response to the first control command comprises:
displaying a plurality of grid lines on the screen to generate the first-tier sub-regions.

7. A display apparatus, comprising:
a screen;
a command receiving module, receiving a first control command and a second control command from a remote controller;
an on-screen display (OSD) module;
a processing module, for controlling the OSD module according to the control commands received by the command receiving module;
an event generating module, generating a cursor movement event according to a movement control signal from the processing module; and an input/output (I/O) interface, outputting the cursor movement event to an external host;
wherein, the processing module controls the OSD module to display a plurality of first-tier sub-regions on the screen of the display apparatus in response to the first control command and displays a plurality of first Arabic numeral reference symbols respectively within the plurality of first-tier sub-regions, such that each one of the plurality of first-tier sub regions corresponds to a particular one of the first Arabic numeral reference symbols;
wherein, the processing module selects one of the first-tier sub-regions and moves a cursor to the selected first-tier sub-region in response to the second control command;
wherein the display apparatus receives an image signal with an image resolution from an external host, the display apparatus displays the image signal on the screen with a screen resolution, and the event generating module generates a second coordinate in the image resolution by transforming the first coordinate of the screen resolution in the cursor movement event; and
an event dividing module, dividing the selected first-tier sub-region into a plurality of second-tier sub-regions; wherein actuation of a predetermined button on the remote controller three consecutive times causes the display apparatus to enter a cursor control mode.

8. The display apparatus according to claim 7, wherein the OSD module displays a plurality of grid lines on the screen to generate the music playing time data first-tier sub-regions.

9. The display apparatus according to claim 7, wherein the plurality of reference symbols correspond to a plurality of buttons on the remote controller, respectively.

10. The display apparatus according to claim 7, wherein the external host moves the cursor according to the cursor movement event.

* * * * *